United States Patent [19]

Lawter et al.

[11] 4,048,476
[45] Sept. 13, 1977

[54] CARD READER

[75] Inventors: Ray L. Lawter, Zanesville; Kenneth L. Shooter, Senecaville; David C. Wills, Cambridge, all of Ohio

[73] Assignee: NCR Corporation, Dayton, Ohio

[21] Appl. No.: 675,395

[22] Filed: Apr. 9, 1976

[51] Int. Cl.² .................. G11B 25/04; G06K 7/08
[52] U.S. Cl. .................... 235/61.11 D; 360/73
[58] Field of Search ..................... 360/2, 73, 88; 235/61.11 R, 61.11 D, 61.12 M

[56] References Cited

U.S. PATENT DOCUMENTS

| 3,890,644 | 6/1975 | Goerzinger et al. | 360/2 |
| 3,899,659 | 8/1975 | Nakai et al. | 235/61.11 |
| 3,953,887 | 4/1976 | Kobylarz et al. | 360/2 |

*Primary Examiner*—Vincent P. Canney

*Attorney, Agent, or Firm*—J. T. Cavender; Wilbert Hawk, Jr.; Richard W. Lavin

[57] ABSTRACT

There is disclosed a low cost manually-operated compact card reader for reading magnetically or similarly encoded record cards or the like, the reader including a guide support assembly for guiding and supporting a manually inserted card, a carriage slidably mounted on the support assembly and engaged by the inserted card for movement thereby to an actuated position, an energy storing drive member secured to the carriage and operated by the movement of the carriage to said actuated position to return the carriage and the card past a reading member, and a velocity limiting device including a rotating member secured to the carriage for limiting the return movement of the carriage and the card to a constant velocity past the reading member.

14 Claims, 5 Drawing Figures

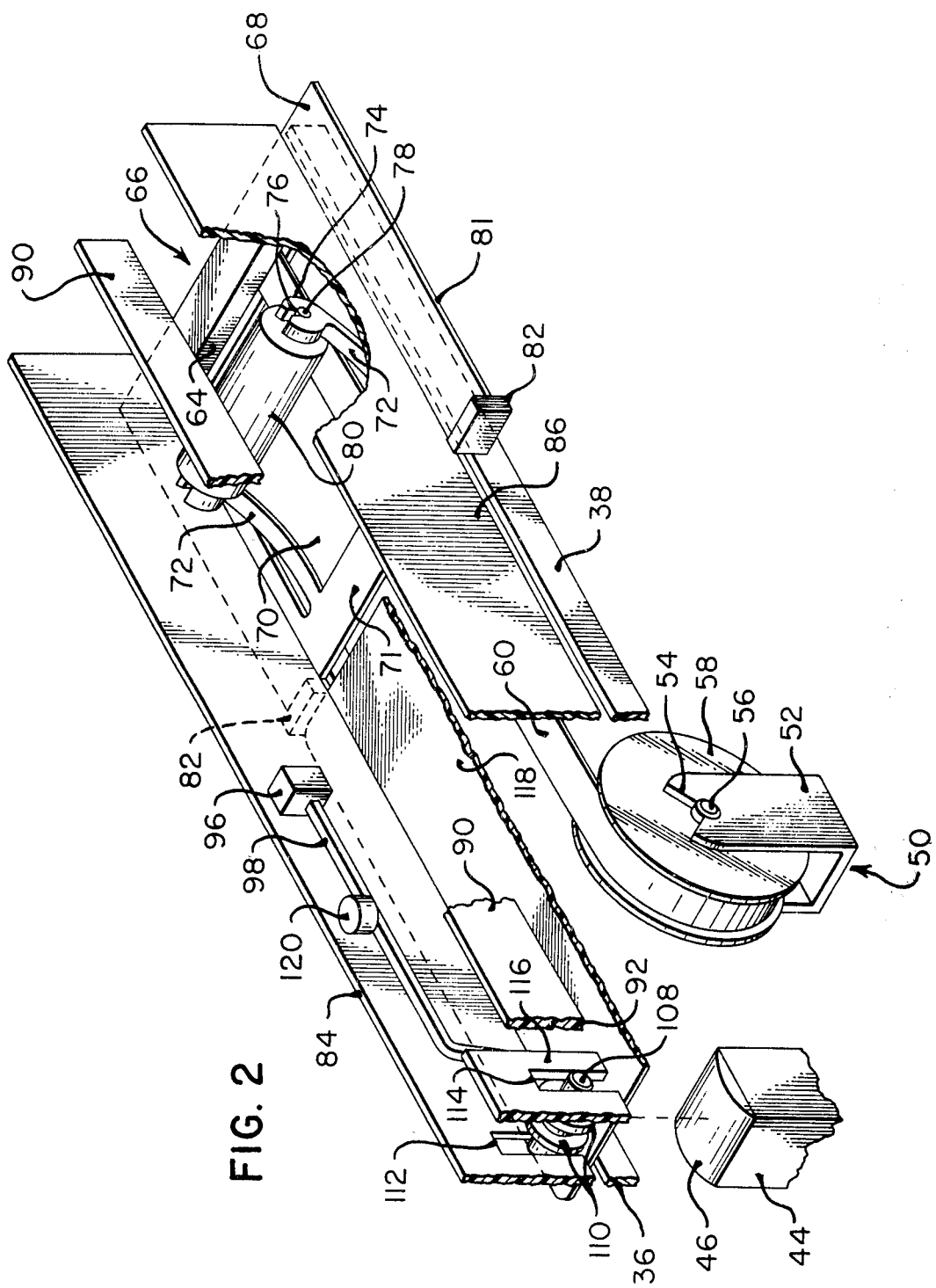

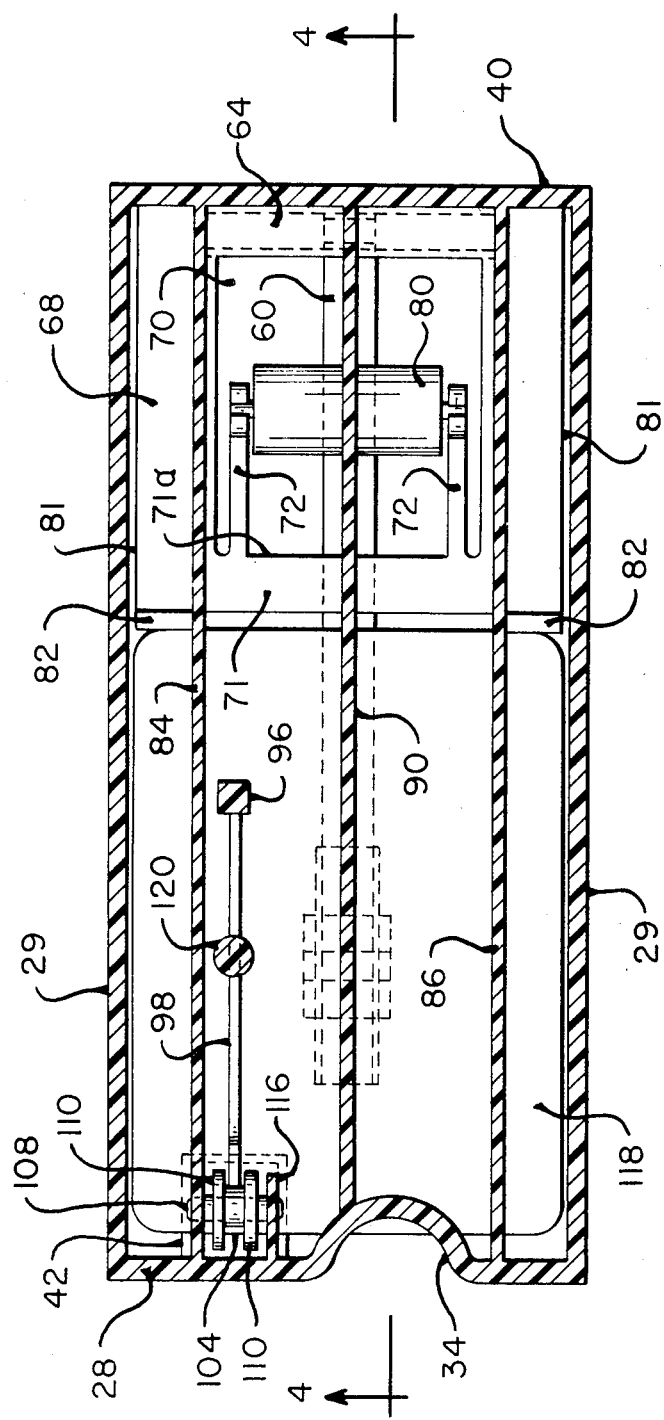

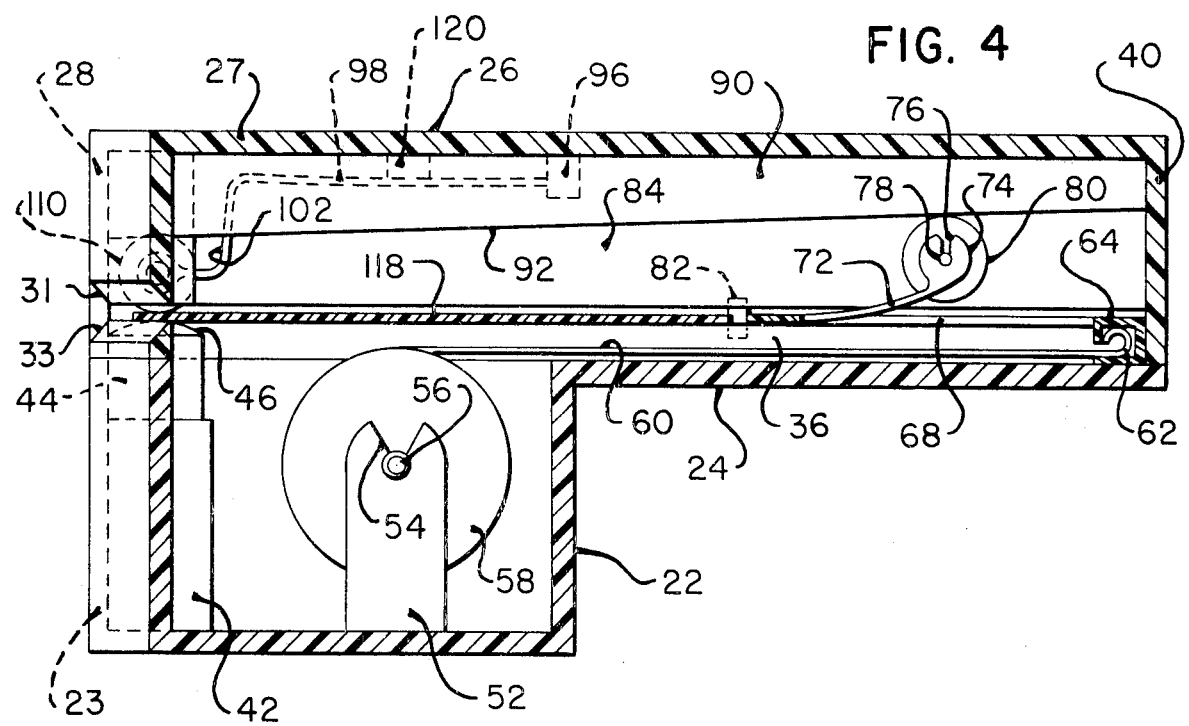
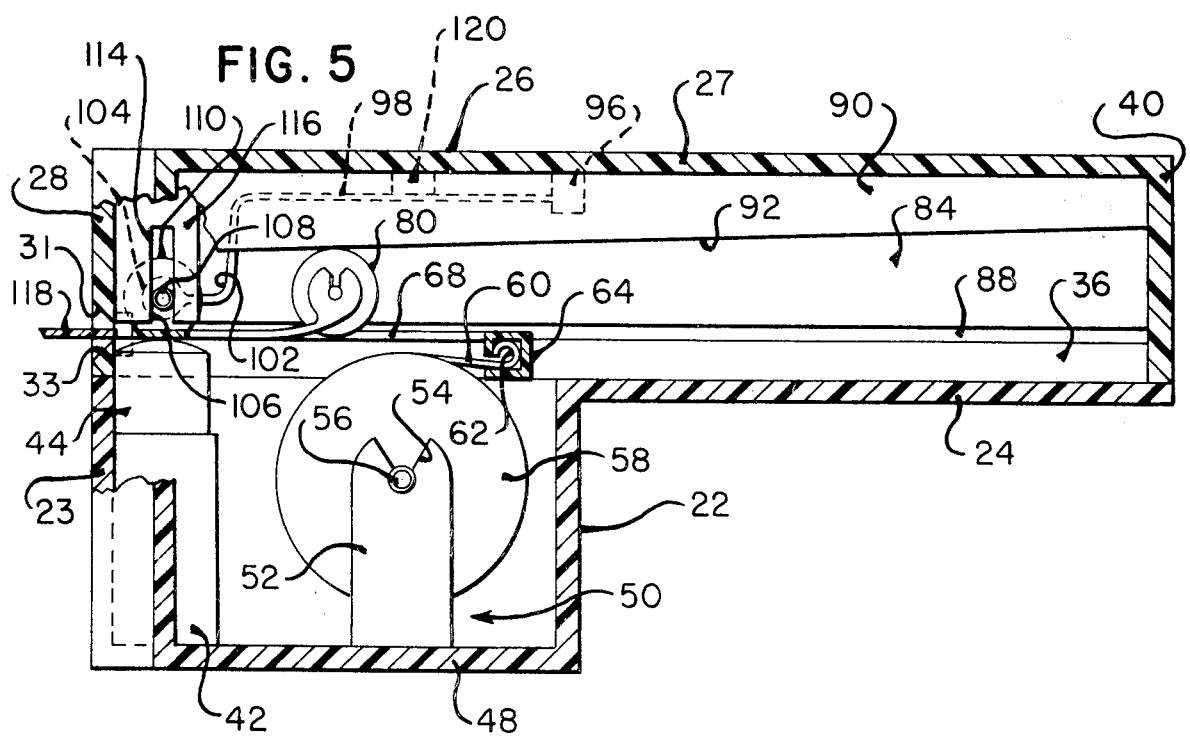

CARD READER

BACKGROUND OF THE INVENTION

The present invention relates to card readers in which an encoded card member is moved past a transducer head which scans and reads encoded information from a portion of the encoded card.

Prior card readers have utilized motor driven drive wheels as the drive means to move the card into and out of the card reader wherein the card member is driven serially past the transducer head. This type of construction resulted in a card reader which was expensive, required precise alignment of the various operating parts in order to produce the desired reading results and had a very high repair rate. In order to avoid these problems of wheel driven card readers, card readers utilizing energy storing means such as springs, and the like, as the drive means were developed. With this type of construction, the spring drive is first expanded and then released to return to its original position, during which return movement, the encoded card is moved past the transducer head. Since the card is required to move past the transducer head at a constant velocity to allow the transducer head to obtain valid readings, and as the return movement of the spring drive is at a constant acceleration, velocity limiting devices are employed to retard the movement of the card to obtain the required velocity. An example of such a velocity limiting device is found in U.S. Pat. No. 3,896,293, in which a dashpot is utilized to provide a constant velocity movement of a magnetic card transport mechanism. While this type of construction will provide the required velocity of movement of the encoded card past the transducing head, it is still subject to necessary adjustments due to environmental operating conditions and wear requiring periodic disassembly of the reader. Consequently, there is still a need for a low cost card reader which is simple in construction and operation, and is free of adjustment requirements. It is therefore an object of this invention to provide an inexpensive card reader construction incorporating a constant velocity drive arrangement without requiring the use of a drive motor. It is another object of this invention to provide an improved velocity limiting device for use with a energy storing drive member which moves an encoded card past a transducer at a constant velocity which is simple in operation and rugged in construction. It is a further object of this invention to provide a constant velocity drive mechanism for use in a card reader which requires no adjustment for its operation and is of such low cost construction as to allow the card reader to be replaced rather than repaired.

SUMMARY OF THE INVENTION

In order to carry out these objects, there is provided a housing wherein a pair of support rail members are positioned for slidably supporting a manually inserted record member. Also included in the housing is a carriage slidably mounted on the rail members and having a pair of abutment members which are engaged by the record member allowing the carriage to be moved by the record member. Secured to the carriage is an energy storing drive member in the form of a negator-type spring reel which, as the carriage is moved toward the rear of the housing by the action of inserting the record member within the housing, a spring member attached to the carriage will uncoil against the recoiling action of the spring member to be in a coiled condition on the reel. Upon release of the record member, the spring member will return to a coiled position on the reel driving the record member and the carriage toward the front of the housing at an accelerating velocity. A transducer mounted within the housing will scan a portion of the record member during its return movement to read information therefrom. To provide a constant velocity of movement to the carriage and the record member, a roller member rotatably mounted on a pair of spring supports which forms a part of the carriage is rotated by its engagement with an inclined surface of the housing, which rotation will exert a constantly increasing drag force on the carriage. This drag force is sufficient to offset the accelerating force of the spring member resulting in the record member moving past the transducer at a constant predetermined velocity.

BRIEF DESCRIPTION OF THE DRAWINGS

The foregoing and other objects, features and advantages of the invention will become apparent from the following preferred embodiment illustrated in the accompanying drawings of which:

FIG. 2 is a perspective view of the card reader with portions of the housing cut away to show details of the drive mechanism.

FIG. 3 is a top elevational view of the card reader housing with the top wall portion removed.

FIG. 4 is a sectional view taken on line 4—4 of FIG. 3 showing details of the drive mechanism when in its expanded position.

FIG. 5 is a sectional view similar to FIG. 4 with a portion of the housing removed showing the drive mechanism in the home position.

DESCRIPTION OF THE PREFERRED EMBODIMENT

Figure 1:
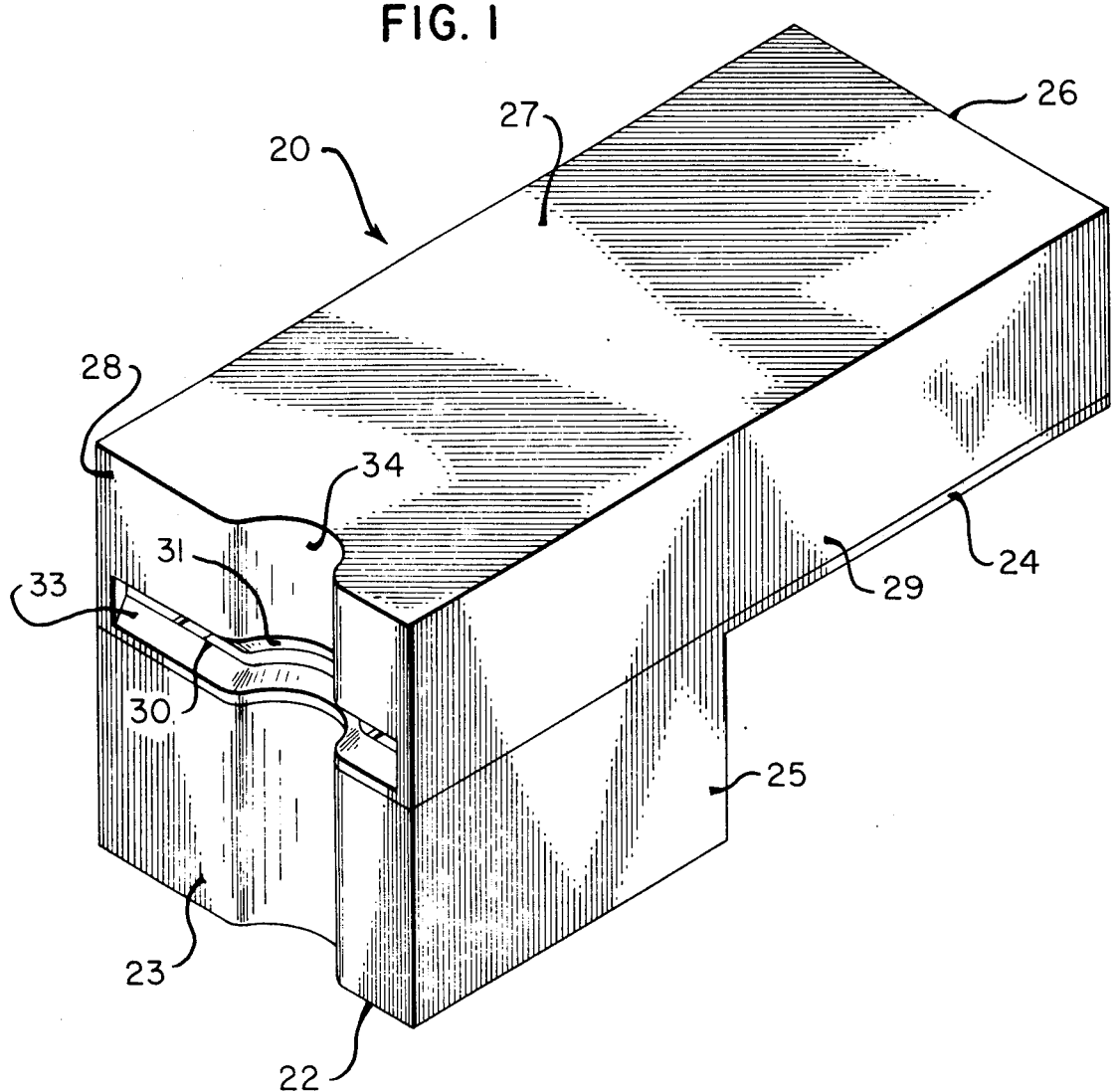
FIG. 1 is a perspective view of the card reader of the present invention.

Referring now to FIG. 1 of the drawing, there is shown a perspective view of the card reader assembly of the present embodiment which is generally indicated by the numeral 20 and includes a support housing member 22 having front 23 and side wall 25 portions and includes a laterally extending lower rear support portion 24. Secured to the support housing member 22 is a cover housing member 26 having top 27, front 28 and side 29 wall portions. As stated previously, the present card reader embodiment is directed to a low cost, compact card reader construction which requires no adjustment of its moving parts after assembly. If the card reader becomes inoperative, the defective card reader is disposed of and replaced with a new card reader. In keeping with these objects, the elements which compose the card reader are, unless otherwise indicated, preferably molded of a high impact plastic material such as styrene. Therefore, the cover housing member 26 is secured to the support housing member 22 by any well known plastic fabrication method such as ultrasonic welding. If it is otherwise desired, the housing members 22 and 26 can be secured by any well known fastening means such as screws.

Located in the front wall portion 28 of the cover housing member 26 is a laterally extending slot 30 (FIG. 1) having chamfered edges 31 and 33, the slot 30 being of a width sufficient to accept an encoded record member such as a credit card 118 (FIG. 2). The credit card 118 is of well known construction having a magnetically encoded strip (not shown) on one of its surfaces wherein data is encoded. Located in the front wall portions 28, 23 of the cover 26 and support 22 housing members is a vertically extending aligned curved recessed portion 34 (FIGS. 1 and 3) which facilitates handling of the record member 118 by the operator such that the record member can be fully inserted through the slot 30 into the reader assembly 20.

As shown more clearly in FIGS. 2, 4, and 5 of the drawing, the support housing member 22 includes a pair of spaced apart rail members 36, 38 extending from a point adjacent the front wall portion 23 of the support housing member lengthwise to the rear edge of the support portion 24. The front and rear edges of the rail members 36, 38 nest with respect to the front wall portion 28 and a rear wall portion 40 (FIGS. 4 and 5) of the cover housing member 26 when the cover housing member is secured to the support housing member 22. Affixed to the boss portion 42 (FIG. 3) of the support housing member 22 in any suitable manner is a transducer head 44 having an upper reading edge 46. Such transducer head 44 may be of any construction well known in the art. The mounting of the transducer head 44 on the boss portion 42 requires that the reading edge 46 be mounted at a height which will engage and serially scan the coded portion of the record member 118 upon movement of the record member past the transducer head.

As best seen in FIGS. 2, 4 and 5, secured to the bottom surface 48 of the support housing 22 by any means such as screws (not shown) is a U-shaped bracket generally indicated by the numeral 50. The bracket 50 includes a pair of opposed upstanding arms 52, each containing an arcuate cutout portion 54 which rotatably supports a shaft 56 to which is mounted a spool 58. Coiled on the spool 58 is an elongated spring strip 60 which may take the form of a negator type spring, the construction of which is well known in the art. Briefly, this type of spring consists of a metal strip of spring material which is arcuately bowed across its cross-section and having a resilient spring action tending to coil the spring upon itself concentrically. Upon the unreeling of the spring strip 60 from its coiled position, a constant force is provided by the stored resilient spring energy which tends to recoil the strip 60 back onto the spool 58. As shown in FIGS. 4 and 5, the end of the spring strip 60 is formed into a coiled portion 62 which is mounted within a slotted depending portion 64 of a carriage assembly generally indicated by the numeral 66. As best seen from FIG. 2, the carriage assembly 66 takes the form of a flat generally rectangular support member 68 which includes the depending portion 64 located at the rear thereof and which has a centrally located cut-out portion 70. Extending rearwardly from the front edge portion 71 of the cut-out portion 70, namely from its inner edge 71a (FIG. 3), are a pair of arm members 72 curving in a generally upward direction (FIGS. 4 and 5), each such arm member 72 terminating in a hub portion 74 containing a slot 76. Rotatably positioned within the slot 76 is a shaft 78 to which is secured a drag member 80 formed in the shape of a cylindrical roller. The function of the drag roller 80 will be described more fully hereinafter.

As seen in FIGS. 2, 4 and 5, the carriage assembly 66 is slidably mounted on the rails 36, 38 of the support housing member 22 with the depending portion 64 of the carriage support member 68 having a width (FIG. 3) which allows it to fit between the rail members 36 and 36. Formed at opposite ends of the front edge portion 71 of the carriage assembly 66 are a pair of abutment members 82 extending from the side edge 81 of the carriage support member 68 to a position adjacent the outer surface of the rail members 36 and 38. It will be seen from this construction that the clearances between the depending portion 64 of the carriage assembly 66 and the abutment members 82 each with respect to the rail members 36, 38 may be selected so as to guide the carriage assembly 66 along the rail members 36, 38, while minimizing any possible skewing of the carriage in its movement.

As best seen from FIGS. 2-5 inclusive, the cover housing member 26 includes a pair of rail members 84, 86 which depend from the top wall portion 27 of the housing member 26. The rail members 84, 86 are positioned in the housing member 26 to overlie and be coplanar with the rail members 36, 38 respectfully of the support member 22 when the cover housing member 26 is assembled to the support housing member 22, thereby forming longitudinal slots 88 with the corresponding rail members 36 and 38 which accommodate the record member 118. The slots 88 extend adjacent and are coextensive with the slot 30 in the front wall portion 28 of the cover housing member 26.

The width of the slots 88 is dependent on the thickness of the record members 188 that are to be accommodated by the card reader assembly 20, the slots 88 acting as a guide for the record member 118 and the carriage assembly 66 as they move within the card reader assembly 20.

Also depending from the top wall portion 27 of the cover housing member 26 and positioned approximately parallel and centrally between the rail members 84 and 86 is a third rail member 90 (FIGS. 2, 3, and 4) having an inclined lower surface 92 which slopes in a downward direction from right to left, i.e. rear to front, as viewed in FIGS. 4 and 5. As will be described more fully hereinafter, the inclined surface 92 of the central rail member 90 coacts with the drag roller 80 to produce a throttling effect on the movement of the carriage assembly 66 as it moves from the rear of the card reader assembly 20 to the front of the card reader assembly during a card reading operation.

As shown more particularly in FIGS. 2-5, inclusive, further depending from the top wall portion 27 of the cover housing member 26 is a support member 96 to which is secured one end of an elongated leaf spring member 98 extending forwardly toward the front wall portion 28 of the cover housing member 26. The free end of the spring member 98 has a stepped portion 102 which terminates in a hub member portion 104 (FIG. 3) containing an aperture 106 rotatably supporting a shaft 108 (FIG. 2). Secured to the shaft 108 are a pair of spaced apart pressure rollers 110. The ends of the shaft 108 are positioned within a pair of aligned vertical extending slots 112, 114 located in the rail member 84 and a stub member 116 secured to the front wall portion 28 of the cover housing member 26, respectively. The pressure roller members 110 overlie the transducer head 44 and are normally urged by the leaf spring member 98 and guided by the slots 112 and 114 into engagement with the upper reading edge 46 of the transducer head 44. As illustrated in FIGS. 2, 4 and 5, the leaf spring member 98 is engaged intermediate its ends by a stop member 120 depending from the top surface 27 of the cover housing member 26. The stop member 120 extends downwardly to a point which biases the spring member 98 in a direction to move the pressure roller members 110 into engagement with the reading edge 46 of the transducer head 44.

In operation, the operator orientating the credit card 118 properly for a reading operation will insert the front edge of the credit card within the slot 30 located in the front wall portion 28 of the card reader assembly 20. As the credit card 118 moves into the slot 30, the front edge thereof will engage the abutment members 82 of the carriage support member 68 (which action is shown in FIG. 5). Further movement of the credit card 118 will engage and cam the pressure rollers 110 in an upward direction against the action of the leaf spring member 98. The operator will then insert the credit card 118 fully into the slot 30 thereby moving the carriage assembly 66 towards the rear of the card reader on the rail members 36, 38 until the depending portion 64 of the carriage assembly engages the rear wall portion 40 of the cover housing member 26 (which position is shown in FIG. 4). While the carriage assembly 66 is guided by the interaction of the rail members 36, 38, 84, 86 with the abutment members 82 and the depending portion 64 during this inward movement, the credit card 118 is guided by the side wall portions 29 (FIG. 3) of the cover housing member 26, the interior dimensions of the housing being selected so that as the credit card 118 moves over the rails 36, 38, the magnetically encoded portion of the credit card 118 will overlie the reading edge 46 of the transducer head 44.

As the carriage assembly 66 moves from the front to the rear of the card reader assembly 20 by the inserting movement of the credit card 118, the spring strip 60 will uncoil from the spool 58. During the uncoiling action of the spring strip 60, the energy to restore same to its coiled position on the spool 58 is generated and stored in such spring strip 60. This stored energy is at a maximum upon the carriage assembly 66 reaching the rear of the card reader assembly. Upon release of the credit card 118 by the operator, the carriage assembly 66 and the credit card 118 will be returned toward the front of the card reader assembly by the movement of the spring strip 60 in its recoiling onto the spool 58. This return movement of the carriage assembly 66 and the credit card 110 would normally occur at a constantly changing rate of acceleration. It is during this return movement that the reading edge 46 of the transducer 44 will scan the magnetically encoded portion of the credit card 118 in a manner well known in the art.

Since the standards set for reading magnetically encoded data require the credit card to move past the transducer head at a constant velocity rate, which is not attained by the re-coiling action of the spring strip 60, a throttling action is utilized to provide the carriage assembly 66 and the credit card 118 with a constant speed velocity as it moves past the transducer head. This throttling action is accomplished by the rotation of the drag roller 80 generated by the engagement of roller 80 with the inclined surface 92 of the rail member 90 under the resilient action of the arms 72 together with the frictional drag generated between the carriage 66 and the rails 36, 38 as the roller 80 is moved downwardly by the inclined surface 92 with continually increasing pressure therebetween under urgence of the spring arms 72 during the movement of the carriage assembly 66 toward the front of the card reader. The particular throttling effect on the speed of the carriage as provided by the operation of the drag roller 80 is determined by the equation:

$$\text{Velocity } (V) = \sqrt{\frac{C_2}{C_1}} \left( X_{max} + \frac{C_3}{C_2} \right) \sin\left( \sqrt{\frac{C_2}{C_1}} \, t \right)$$

where $$C_1 = \left( \frac{SI}{r^2 C} - \frac{CI}{r^2 S} - mN - \frac{Cm}{S} + M + m \right)$$

$C_2 = (\mu CKN + SKN)$
$C_3 = mg + \mu g (M+m) + \mu CB - A + SB$
$X_{max} = A - (C_3/C_2)$ where
$S = \sin\alpha$
$I = $ Moment of inertia of roller 80
$C = \cos\alpha$
$m = $ mass of roller 80
$M = $ Mass of carriage 66 and record member 118
$\mu = $ coefficient of friction-carriage 66 to support rails 36, 38
$K = $ arm 72 spring rate
$g = $ acceleration of gravity $B = $ arm 72 spring force at home position
$A = $ Negator Spring 60 force
$\alpha = $ angle of inclined surface 92
$t = $ time
$N = \tan\alpha$
$r = $ radius of roller 80

In the present embodiment, where a constant velocity of between 3 and 30 cm/sec is required of the credit card 118, it has been found that if the drag roller 80 has a mass of 0.02 lbs, the arms 72 having a spring rate of 0.012 lbs/inch with the surface 92 inclined at an angle of 10° and the weight of the carriage 66 being 0.02 lbs., the drag roller 80 will retard the movement of the carriage to a constant speed of approximately 15 cm/sec. This speed is sufficient for the transducer head 44 to provide acceptable data readings from the credit card 118. It will be seen that as the credit card 118 moves towards the front of the card reader, the inclined surface 92 of the rail 90 will move the drag roller 80 in a downward direction against the resilient action of the arms 72. This deflection of the arms 72 by the downward movement of the roller 80 will incrementally increase the frictional drag on the carriage 66 which together with the drag generated by the rotating roller 80 will offset the acceleration component of the spring strip 60 resulting in the movement of the carriage 66 and the credit card 118 at a constant velocity from the rear to the front of the card reader.

As the credit card 118 moves past the transducer head 44, the pressure rollers 110 will urge the encoded portion of the credit card into engagement with the reading edge 46 of the transducer head 44 due to the action of the spring 98. Since the credit card 118 is slidably mounted on only the rails 36, 38 of the support member 22, very low friction forces are present to affect the movement of the card through the card reader.

While the present embodiment has been described with respect to the reading of a magnetically encoded card member, it is obvious that the card reader structure can accommodate other types of information bearing card members such as embossed encoded cards or slotted encoded cards.

While the principles of the invention have been made clear in the illustrated embodiment, it will be obvious to those skilled in the art that many modifications of the structure, arrangement, elements and components can be made which are particularly adapted for specific environments and operating requirements without departing from these principles. Thus, while a particular type of spring drive has been disclosed, it is obvious that any other type of spring actuator can be used. Additionally, skids and shoes or other types of drag members may be substituted for the drag roller 80. The appended claims intend to cover any such modification within the limits only of the true spirit and scope of the invention.

What is claimed is:

1. Apparatus for reading a record member comprising means for supporting said record member for movement between a first and second position, a read station positioned between said first and second positions, and transport means engaging the record member and movable therewith between said first and second positions, the combination comprising:
  a. stationary drag generating means extending between said first and second positions;
  b. actuating means operatively associated with said transport means and responsive to the movement of the transport means to said second position to move the transport means to said first position at a constant acceleration wherein the transport means will move the record member past the read station;
  c. and means carried by said transport means for opposing the action of said actuation means including drag means engaging said drag generating means and actuated by movement of the transport means for retarding the movement of the transport means to said first position whereby the record member will move past the read station at a constant velocity.

2. The apparatus of claim 1 including means urging said drag means into engagement with said drag generating means for increasing the retarding action of said drag means during movement of the transport means to said first position.

3. The apparatus of claim 1 in which said drag means includes
  a. a roller member;
  b. and resilient means mounted on said transport means for urging said roller member into engagement with said drag generating means thereby rotating the roller member along said drag generating means to retard the movement of the transport means from said second position to said first position.

4. The apparatus of claim 3 in which said drag generating means comprises a surface inclined in a downward direction from said second position to said first position.

5. The apparatus of claim 4 in which said resilient means comprises a pair of flexible arm members extending in an upward direction for rotatably supporting the roller member therebetween, said arm members flexing as the roller member moves along the inclined surface to increase the retarding action of the roller member on the transport means.

6. An apparatus for reading an encoded record member comprising:
  a. means supporting an encoded record member for movement between a first and second position;
  b. transport means slidably mounted on said supporting means for movement between said first and second position, said transport means engaged by said record member for movement from said first position to said second position;
  c. means engaging said transport means and responsive to the movement of the transport means to said second position to actuate the transport means and the record member at a constant acceleration from said second position to said first position;
  d. means for reading encoded date on said record member positioned adjacent said supporting means, said reading means reading encoded data from the record member during movement of the record member from said second position to said first position; and
  e. a drag generating means extending between said first and second positions and mounted adjacent said supporting means;
  f. and a rotatable member carried by said transport means and yieldingly engaging said drag generating means, said rotatable member being rotated by said drag generating means during movement of said transport means from said second position to said first position to generate a drag on said transport means whereby the record member will move past the reading means at a uniform velocity.

7. The reading apparatus of claim 6 in which said drag generating means comprises an engaging surface extending between said first and second position, said engaging surface being inclined downwardly with respect to said supporting means from said second position to said first position for incrementally increasing the drag on the transport means.

8. The reading apparatus of claim 7 which further includes resilient means secured to said transport means and rotatably supporting said rotatable members, said resilient means urging the rotatable member into engagement with said inclined surface whereby the rotatable member will rotate upon movement of the transport means from said second position to said first position, said rotatable member being deflected by said contact surface as the transport means moves towards said first position to increase the drag on the transport means.

9. The reading apparatus of claim 8, in which the resilient means comprises a pair of flexible support arms extending from said transport means for rotatably supporting said rotatable member.

10. A card reader apparatus comprising:
  a. an elongated support means;
  b. a cover secured to said support means, said cover having an inclined surface extending along and spaced apart from said support means;
  c. a carriage member mounted on said support means and adapted for movement between a first and second position on said support means;
  d. an actuating member engaging said carriage member and responsive to the movement of the carriage member to said second position to cause the return movement of the carriage member to said first position, said carriage member being moved to said second position by an encoded record member slidably mounted on said support means and moved from said first position to said second position;
  e. a transducer member mounted on said support means for scanning across the record member upon movement of the record member and the carriage member from said second position to said first position;

f. and a roller member resiliently mounted on said carriage member and engaging said inclined surface for rotation thereby upon movement of the carriage member to said first position by said actuating member, the rotation of said roller member opposing the movement of the carriage member by said actuating member whereby the record member will move past the transducer member at a constant velocity.

11. The transport mechanism of claim 10 in which said carriage member includes a pair of leaf spring portions extending upwardly from said carriage member, said leaf spring portions rotatably supporting said roller member against said inclined surface whereby upon movement of said carriage member to said first position, said inclined surface will move the roller member against the action of said leaf spring portion to increase the opposition of said roller member to the movement of the carriage member to said first position.

12. The transport mechanism of claim 11 in which said carriage member includes a pair of abutment portions engaged by a record member positioned on said support means whereby movement of the record member will move the carriage member a similar distance against the action of said actuating member.

13. In a card reader, the combination comprising:
   a. a base member having a pair of elongated supporting surfaces for supporting a manually displaced encoded card member positioned thereon;
   b. a transport member mounted on said supporting surfaces for movement by the card member between a first and second position;
   c. an energy storing mechanism secured to said base member, said energy storing mechanism comprising a reeling device including a reeled resilient strip member secured to said transport mechanism and capable of automatically rewinding in reeled configuration on said reeling device, said reeling device being responsive to the movement of the transport member from said first position to said second position to store energy thereby, the movement to said second position unreeling said strip member from said reeling device, said reeling device rewinding said strip member upon release of the card member to move the transport member and the card member from said second position to said first position at a constant acceleration;
   d. a transducer member mounted on said base member and positioned adjacent said supporting surfaces to scan the record member upon movement of the record member from said second position to said first position;
   e. a cover member secured to said base member and having a surface positioned adjacent to and parallel with said supporting surfaces, said surface inclined downwardly from the second position of said transport member to the first position;
   f. resilient support means secured to said transport member and extending in a direction towards said inclined surface;
   g. and a drag member rotatably mounted on said resilient support means and urged into engagement with said inclined surface whereby upon movement of said transport member from said second position to said first position, said drag member will rotate along said inclined surface and move in a downward direction to limit the movement of the record card past the transducer member to a constant velocity.

14. Apparatus for reading a record member comprising:
   a. means for supporting said record member for movement between a first and second position;
   b. a drag generating surface coextensive with said supporting means and extending between said first and second positions;
   c. a read station positioned adjacent said supporting means;
   d. transport means engaging the record member and movable therewith between said first and second positions;
   e. actuating means operatively associated with said transport means and responsive to the movement of the transport means to said second position to move the transport means to said first position at a constant acceleration wherein the transport means will move the record member past the read station;
   f. and means for retarding the action of said actuating means on said transport means including a rotatable drag means secured to said transport means and engaging said drag generating surface for rotation thereby upon movement of said transport means between said first and second positions;
   g. and means yieldingly supporting said rotatable drag means for urging said rotatable drag means into engagement with said drag generating means, said supporting means being actuated by said drag generating means during movement of said transport means between said first and second position to vary the retarding action on said transport means whereby the record member will move past the read station at a constant velocity.

* * * * *